United States Patent [19]

Nakano et al.

[11] Patent Number: 4,760,468
[45] Date of Patent: Jul. 26, 1988

[54] COLOR VIDEO SIGNAL RECORDING AND REPRODUCING APPARATUS

[75] Inventors: Ryo Nakano; Takeyoshi Ito, both of Yokohama; Yasutoshi Matsuo, Kawasaki, all of Japan

[73] Assignee: Victor Company of Japan, Ltd., Kanagawa, Japan

[21] Appl. No.: 945,646

[22] Filed: Dec. 23, 1986

[30] Foreign Application Priority Data

Dec. 27, 1985 [JP] Japan .................. 60-296898

[51] Int. Cl.$^4$ .................. H04N 9/81; H04N 9/86
[52] U.S. Cl. .................. 358/310; 358/320; 358/330; 358/343; 360/9.1; 360/19.1
[58] Field of Search .............. 358/310, 320, 330, 334, 358/343; 360/9.1, 19.1

[56] References Cited

U.S. PATENT DOCUMENTS 4,597,019 6/1986 Nishimoto et al. .................. 358/320
4,618,894 10/1986 Ichinoi .................. 358/310

FOREIGN PATENT DOCUMENTS

60-51389 3/1985 Japan .
60-42997 3/1985 Japan .

Primary Examiner—L. T. Hix
Assistant Examiner—D. Rutledge
Attorney, Agent, or Firm—Michael N. Meller

[57] ABSTRACT

A color video signal recording and reproducing apparatus comprises a first circuit for delaying by a time period T a reproduced time-compressed line-sequential color difference signal in which time-compressed first and second color difference signals are alternately transmitted in time sequence for every time period T, a second circuit for delaying a reproduced luminance signal by a time period $2nT+\alpha$, where $n=1$ or $2$ and $0 \leq \alpha \leq T$, and a time base expanding circuit supplied with the reproduced time-compressed line-sequential color difference signal and an output signal of the first circuit for writing these signals into a memory responsive to a first clock pulse produced based on a synchronizing signal within the reproduced time-compressed line-sequential color difference signal and for reading out the stored signals responsive to a second clock pulse produced based on a synchronizing signal within an output delayed reproduced luminance signal of the second circuit, so as to simultaneously output in parallel first and second color difference signals having the time base thereof expanded and returned to the original time base and matched with the time base of the reproduced luminance signal.

9 Claims, 6 Drawing Sheets

COLOR VIDEO SIGNAL RECORDING AND REPRODUCING APPARATUS

BACKGROUND OF THE INVENTION

The present invention generally relates to color video signal recording and reproducing apparatuses, and more particularly to a color video signal recording and reproducing apparatus which simultaneously records and simultaneously reproduces a luminance signal and color difference signals on and from independent tracks of a recording medium.

There is a conventional color video signal recording and reproducing apparatus (hereinafter simply referred to as a recording and reproducing apparatus) which separates a color video signal into a luminance signal and two kinds of color difference signals, and compresses the time base of the two kinds of color difference signals into ½ the original time base. The two kinds of time-compressed color difference signals are alternately transmitted in time sequence as a time-compressed line-sequential color difference signal. The time-compressed line-sequential color difference signal and the luminance signal are frequency-modulated independently and are recorded simultaneously on and reproduced simultaneously from independent tracks of a recording medium.

According to this conventional recording and reproducing apparatus, since the time-compressed line-sequential color difference signal and the luminance signal are simultaneously reproduced from independent tracks of the recording medium, it is necessary to match the time bases of these reproduced signals. For this reason, a synchronizing signal is added to both the time-compressed line-sequential color difference signal and the luminance signal at the time of the recording, and the synchronizing signals are used when expanding the time base of the reproduced time-compressed line-sequential color difference signal back into the original time base at the time of the reproduction. A memory is used for expanding the time base of the reproduced time-compressed line-sequential color difference signal. Hence, at the time of the reproduction, the write-in of the reproduced time-compressed line-sequential color difference signal to the memory is carried out based on the synchronizing signal within the reproduced time-compressed line-sequential color difference signal, and the read-out from the memory is carried out based on the synchronizing signal within the reproduced luminance signal. The synchronizing signal within the reproduced luminance signal is different from horizontal and vertical synchronizing signals of the color video signal. The above described recording and reproducing apparatus is disclosed in a Japanese Laid-Open patent application No. 60-42997, for example.

Furthermore, in the conventional recording and reproducing apparatus, a certain interval is provided between a write-in clock pulse and a read-out clock pulse for the memory so that a predetermined inactive interval is provided between the write-in time period and the read-out time period. By providing this predetermined inactive interval, it is possible to prevent a signal dropout caused by partial overlap of the write-in time period and the read-out time period even when a jitter is generated between the two signals simultaneously reproduced from the independent tracks of the recording medium and even when a mechanical error exists between heads which carry out the recording and reproduction of the signals on and from the recording medium.

However, in the conventional recording and reproducing apparatus, the predetermined inactive interval is set to an extremely short time in the order of 2.5 $\mu$sec, for example. As a result, when a dub-recording is carried out a plurality of times, the above described jitter and mechanical error between the heads are accumulated and it no longer becomes possible to prevent the partial overlap of the write-in time period and the read-out time period by the provision of the extremely short inactive interval.

SUMMARY OF THE INVENTION

Accordingly, it is a general object of the present invention to provide a novel and useful color video signal recording and reproducing apparatus in which the problems described heretofore are eliminated.

Another and more specific object of the present invention is to provide a color video signal recording and reproducing apparatus comprising a first delay circuit for delaying by a predetermined time period T a reproduced time-compressed line-sequential color difference signal in which time-compressed first and second color difference signals are alternately transmitted in time sequence for every time period T, a second delay circuit for delaying a reproduced luminance signal by a time period $2nT+\alpha$, where $n=1$ or 2 and $0 \leq \alpha \leq T$, and time base expanding means supplied with the reproduced time-compressed line-sequential color difference signal and an output delayed signal of the first delay circuit for writing these signals into memory means responsive to a first clock pulse which is produced based on a synchronizing signal within the reproduced time-compressed line-sequential color difference signal and for reading out the stored signals responsive to a second clock pulse which is produced based on a synchronizing signal within an output delayed reproduced luminance signal of the second delay circuit, so as to simultaneously output in parallel first and second color difference signals having the time base thereof expanded and returned to the original time base and matched with the time base of the reproduced luminance signal. According to the recording and reproducing apparatus of the present invention, it is possible to obtain a maximum time base compensation range of +0.25 H to −2.5 H which is considerably wide compared to the time base compensation range of the conventional recording and reproducing apparatus, where H denotes one horizontal scanning period. Hence, it is possible to positively prevent an overlap of the write-in and read-out time periods even when a jitter is generated between the two signals simultaneously reproduced from independent tracks of a recording medium and even when a mechahical error exists between heads which carry out the recording and reproduction of the signals on and from the recording medium. In addition, when a charge coupled device or the like is used for the memory means of the time base expanding means, it is possible to reduce the cost and the circuit scale compared to the case where a digital memory is used. For example, two pairs of charge coupled devices may be used as analog memories constituting the memory means of the time base expanding circuit, and in this case, there are advantages in that the two kinds of color difference signals may be written into one pair of charge coupled devices simultaneously and that the production of the clock pulses is thereby facilitated.

Other objects and features of the present invention will be apparent from the following detailed description when read in conjunction with the accompanying drawings.

BRIEF DESCRIPTION OF THE DRAWINGS

FIGS. 7(A) through 7(J) schematically show the operation of the circuit shown in FIG. 3 during a reproducing mode.

DETAILED DESCRIPTION

Figure 1:
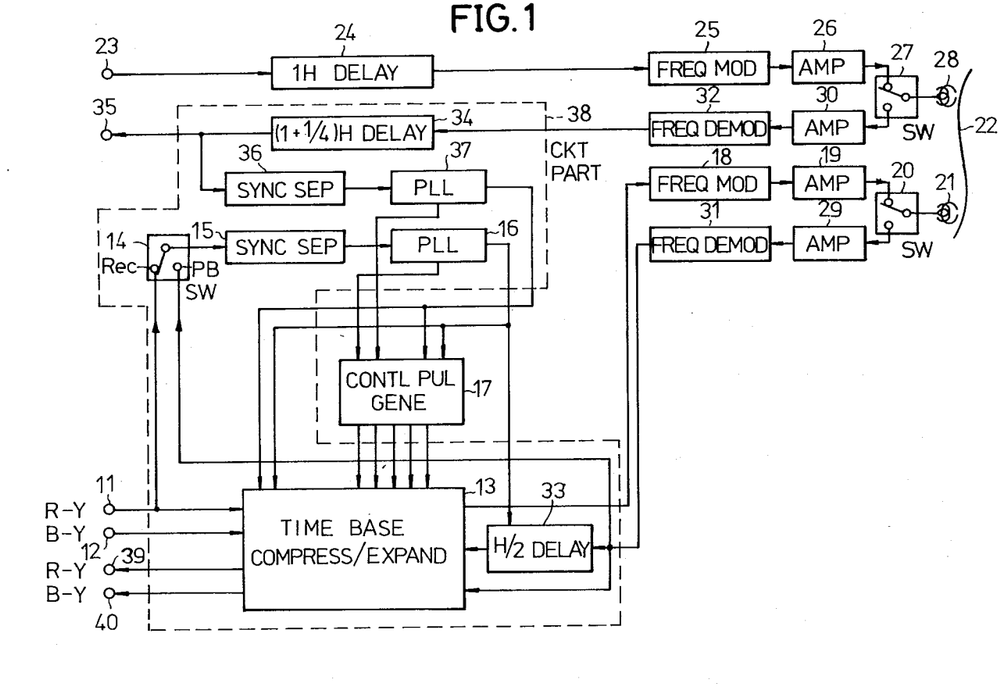
FIG. 1 system block diagram showing an embodiment of the color video signal recording and reproducing apparatus according to the present invention.

FIG. 1 shows an embodiment of the color video signal recording and reproducing apparatus according to the present invention. First, description will be given with respect to the operation of the apparatus during a recording mode. A first color difference signal (R−Y) applied to an input terminal 11 is added with a synchronizing signal with a period of 1 H, where H denotes one horizontal scanning period. A second color difference signal (B−Y) is applied to an input terminal 12. The color difference signals (R−Y) and (B−Y) are supplied to a time base compressing/expanding circuit 13 wherein the time base is compressed by ½ so that information amounting to 1 H can be transmitted in a time period of 0.5 H. The compressing/expanding circuit 13 alternately transmits the time-compressed color difference signals (R−Y)c and (B−Y)c in time sequence for every 0.5H as a time-compressed line-sequential color difference signal.

On the other hand, the color difference signal (R−Y) from the input terminal 11 is passed through a switch 14 which is connected to a contact Rec and is supplied to a synchronizing signal separating circuit 15 wherein the synchronizing signal is separated. The output synchronizing signal of the separating circuit 15 is supplied to a phase locked loop (PLL) circuit 16. The PLL circuit 16 generates a clock pulse which has a predetermined frequency and is in phase synchronism with the output synchronizing signal of the separating circuit 15 and a signal which is derived from the clock pulse. The clock pulse from the PLL circuit 16 is supplied to the compressing/expanding circuit 13, and the signal from the PLL circuit 16 is supplied to a control pulse generator 17. As will be described later, the control pulse generator 17 generates a plurality of control pulses for controlling a plurality of switches within the compressing/expanding circuit 13.

During the recording mode, the compressing/expanding circuit 13 carries out a time base compression. A pulse obtained by frequency-dividing the output clock pulse of the PLL circuit 16 by ½ is used as a write-in clock pulse for the write-in to analog memories within the compressing/expanding circuit 13, and the output clock pulse of the PLL circuit 16 is used as a read-out clock pulse for the read-out from the analog memories.

The compressing/expanding circuit 13 outputs the time-compressed line-sequential color difference signal in which the time-compressed color difference signals (R−Y)c and (B−Y)c having the time base thereof compressed by ½ are alternately transmitted in time-sequence for every 0.5 H, and this time-compressed line-sequential color difference signal is supplied to a rotary magnetic head 21 via a frequency modulator 18, a recording amplifier 19 and a switching circuit 20. The head 21 records an output FM time-compressed line-sequential color difference signal of the switching circuit 20 on a magnetic tape 22.

On the other hand, a luminance signal which is to be recorded is applied to an input terminal 23 and is supplied to a 1 H delay circuit 24. A time delay of 1 H is introduced when the color difference signals (R−Y) and (B−Y) are time-compressed by ½ in the compressing/expanding circuit 13, and the 1 H delay circuit 24 is provided to match the timing of the luminance signal with the timings of the time-compressed color difference signals (R−Y)c and (B−Y)c. An output delayed luminance signal of the 1 H delay circuit 24 is supplied to a rotary magnetic head 28 via a frequency modulator 25, a recording amplifier 26 and a switching circuit 27. The head 28 records an output FM luminance signal of the switching circuit 27 on the magnetic tape 22. The heads 21 and 28 respectively and simultaneously record the FM time-compressed compressed line-sequential color difference signal and the FM luminance signal on independent tracks of the magnetic tape 22.

Figure 2:
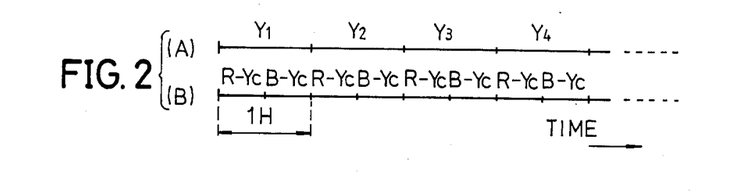
FIGS. 2(A) and 2(B) respectively show an example of the format of the information recorded on a track of a recording medium in the present invention.

For example, the FM luminance signal is recorded on one track of the magnetic tape 22 for every 1 H in the sequence of signals Y1, Y2, Y3, Y4, . . . as shown in FIG. 2(A). At the same time, the FM time-compressed line-sequential color difference signal is recorded on another track of the magnetic tape 22 so that the two kinds of FM time-compressed color difference signals are alternately recorded in time sequence for every 0.5 H in the sequence of signals (R−Y)c, (B−Y)c, (R−Y)c, (B−Y)c, . . . as shown in FIG. 2(B), where the subscript "c" indicates that the signal is a time-compressed signal.

Next, description will be given with respect to the operation of the apparatus during a reproducing mode. The signals simultaneously reproduced from the independent tracks of the magnetic tape 22 by the heads 21 and 28 are passed through the respective switching circuits 20 and 27 and preamplifiers 29 and 30, and are supplied to respective frequency demodulators 31 and 32 wherein the reproduced signals are frequency-demodulated. A reproduced time-compressed line-sequential color difference signal obtained from the frequency demodulator 31 is delayed by a time period of H/2 (0.5 H) in a H/2 delay circuit 33, and the delayed reproduced time-compressed line-sequential color difference signal is supplied to the compressing/expanding circuit 13. The reproduced time-compressed line-sequential color difference signal is also supplied directly to the compressing/expanding circuit 13 and to the separating circuit 15 via the switch 14 which is connected to a contact PB. On the other hand, the reproduced luminance signal from the frequency demodulator 32 is delayed by a time period of 1.25 H in a (1+¼)H delay circuit 34, and the delayed reproduced luminance signal is supplied to an output terminal 35. The delayed reproduced luminance signal is also supplied to a synchronizing signal separating circuit 36 wherein the synchronizing signal, for example, is separated. The synchronizing signal from the separating circuit 36 is supplied to a PLL circuit 37. The PLL circuit 37 generates a clock pulse which has a predetermined frequency and is in phase synchronism with the output synchronizing signal of the separating circuit 36 and a signal which is derived from the clock pulse. The clock pulse from the PLL circuit 37 is supplied to the compressing/expanding circuit 13, and the signal from the PLL circuit 37 is supplied to the control pulse generator 17.

Figure 3:
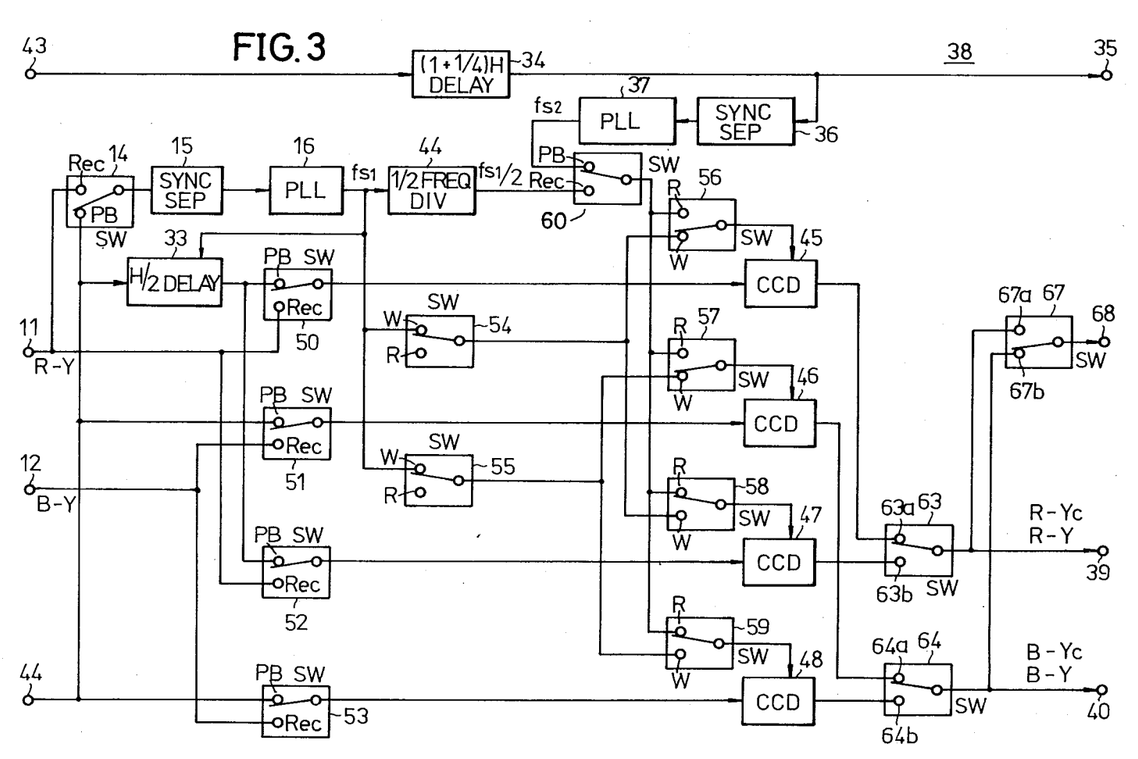
FIG. 3 is a system circuit diagram showing an embodiment of a circuit part within the block system shown in FIG. 1.

Next, description will be given with respect to the operation of a circuit part 38 indicated by a phantom line in FIG. 1. FIG. 3 shows an embodiment of the circuit part 38, and in FIG. 3, those parts which are the same as those corresponding parts in FIG. 1 are designated by the same reference numerals. In FIG. 3, the compressing/expanding circuit 13 within the circuit part 38 comprises a ½ frequency divider 44, charge coupled devices (CCDs) 45 through 48 each having N stages, where N is a natural number, and switches 50 through 60, 63, 64 and 67. The switches 14, 50 through 53 and 60 are connected to respective contacts Rec during the recording mode and are connected to respective contacts PB during the reproducing mode.

First, description will be given with respect to the operation of the circuit part 38 during the recording mode. The color difference signal (R−Y) applied to the input terminal 11 is supplied to the CCDs 45 and 47 via the respective switches 50 and 52. In addition, the color difference signal (R−Y) from the input terminal 11 is supplied to the separating circuit 15 via the switch 14. The separating circuit 15 separates a horizontal synchronizing signal from the color difference signal (R−Y) and supplies the horizontal synchronizing signal to the PLL circuit 16.

Figure 4:
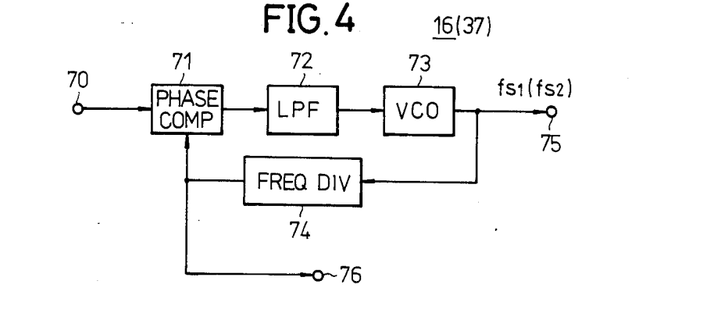
FIG. 4 is a system block diagram showing an embodiment of a phase locked loop circuit within the block system shown in FIG. 1.

FIG. 4 shows an embodiment of the PLL circuit 16. The PLL circuit 16 comprises a phase comparator 71, a lowpass filter 72, a voltage controlled oscillator (VCO) 73 and a ½ N frequency divider 74. The horizontal synchronizing signal from the separating circuit 15 is supplied to the phase comparator 71 via a terminal 70. An output of the phase comparator 71 is supplied to the VCO 73 via the lowpass filter 72. An output of the VCO 73 is supplied to a terminal 75 and to the frequency divider 74, and an output of the frequency divider 74 is supplied to a terminal 76 and to the phase comparator 71. The phase comparator 71 compares the phase of the horizontal synchronizing signal from the terminal 70 and the phase of the signal from the frequency divider 74 and produces a phase error signal dependent on the phase error between the two signals. The phase error signal is supplied to the VCO 73 via the lowpass filter 72 to control the output oscillation frequency of the VCO 73. Accordingly, a signal which has a frequency $fs1 = 2Nf_H$ and is in phase synchronism with the horizontal synchronizing signal from the terminal 70 is outputted via the terminal 75 and is supplied to a ½ frequency divider 44 and the switches 54 and 55 shown in FIG. 3, where $f_H$ denotes the horizontal scanning frequency. The signal from the terminal 76 is supplied to the control pulse generator 17 shown in FIG. 1.

The PLL circuit 37 shown in FIGS. 1 and 3 has a construction essentially the same as that of the PLL circuit 16 shown in FIG. 4, except that the PLL circuit 37 produces a signal having a frequency $fs2 = Nf_H$. Hence, the frequency dividing ratio of the frequency divider 74 of the PLL circuit 37 is set to 1/N instead of ½ N.

In FIG. 3, the output signal fs1 of the PLL circuit 16 is applied to contacts W of the switches 54 and and is also supplied to the ½ frequency divider 44 and to the H/2 delay circuit 33. An output signal of the frequency divider 44 having a frequency of fs½ is applied to contacts R of the switches 56 through 59 via the switch 60. An output of the switch 54 is applied to contacts W of the switches 56 and 58, and an output of the switch 55 is applied to contacts W of the switches 57 and 59. Outputs of the switches 56 through 59 are supplied to corresponding CCDs 45 through 48 as clock pulses.

On the other hand, the color difference signal (B−Y) applied to the input terminal 12 is supplied to the CCDs 46 and 48 via the respective switches 51 and 53. Outputs of the CCDs 45 and 47 are applied to contacts 63a and 63b of the switch 63, respectively. Outputs of the CCDs 46 and 48 are applied to contacts 64a and 64b of the switch 64, respectively. An output of the switch 63 is supplied to an output terminal 39 and to a contact 67a of the switch 67. An output of the switch 64 is supplied to an output terminal 40 and to a contact 67b of the switch 67. An output of the switch 67 is supplied to the frequency modulator 18 shown in FIG. 1 via a terminal 68.

Figure 5:
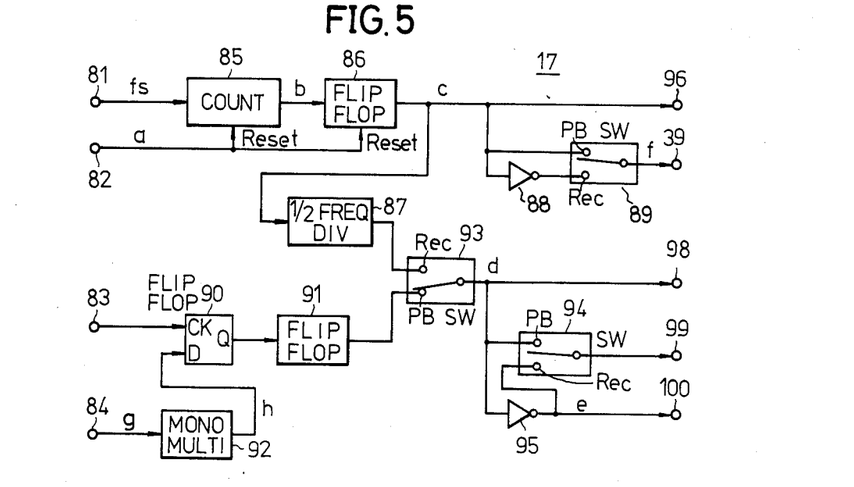
FIG. 5 is a system circuit diagram showing an embodiment of a control pulse generator within the block system shown in FIG. 1.
Figure 6:
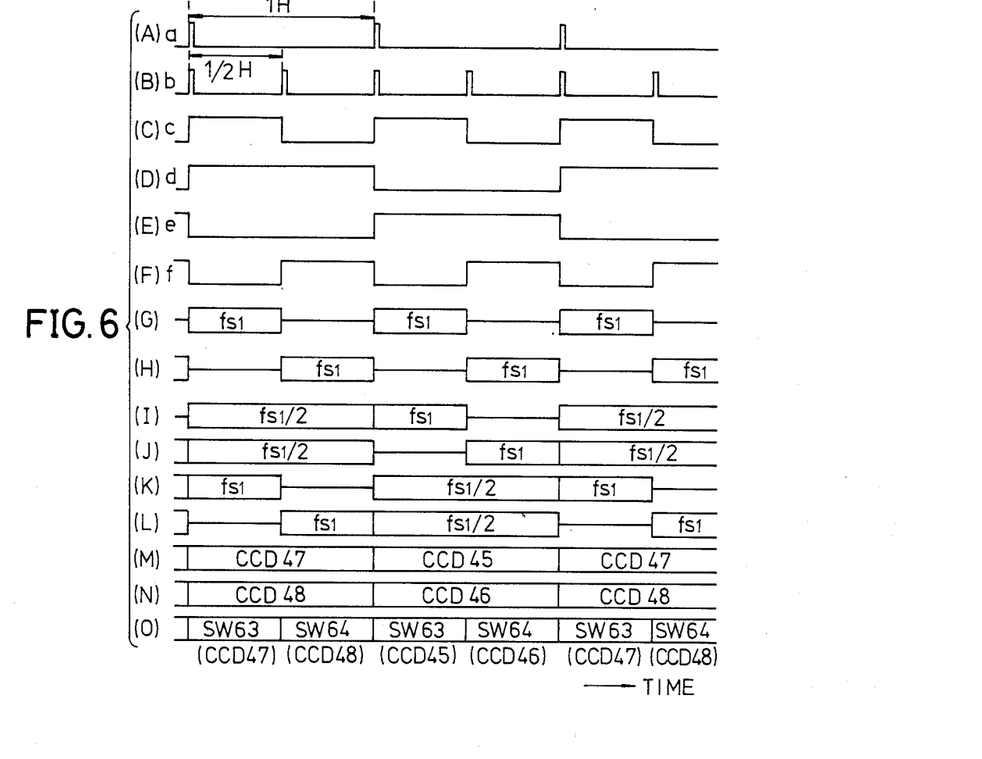
FIGS. 6(A) through FIGS. 6(O) are timing charts for explaining the operation of the circuits shown in FIGS. 3 and 5 during a recording mode.

The switching of the switches 54 through 59 is controlled by control pulses from the control pulse generator 17. FIG. 5 shows an embodiment of the control pulse generating circuit 17. FIGS. 6(A) through 6(O) are timing charts showing the signal waveforms at various parts of the control pulse generator 17 shown in FIG. 5 together with the signal output timings of the switches 54 through 59, 63, 64 and 67 shown in FIG. 3. The control pulse generator 17 comprises a counter 85, flip-flops 86, 90 and 91, a ½ frequency divider 87, inverters 88 and 95, switches 89, 93 and 94 which are connected to respective contacts Rec in the recording mode and are connected to respective contacts PB in the reproducing mode, and a monostable multivibrator 92.

The signal fs1 from the PLL circuit 16 is applied to a terminal 81, and the signal a shown in FIG. 6(A) from the frequency divider 74 within the PLL circuit 16 is applied to a terminal 82. The output signal a of the frequency divider 74 will not cease even when a dropout of the horizontal synchronizing signal occurs due to some reason. Accordingly, by using the signal a and not the horizontal synchronizing signal itself, it is possible to prevent a large error from being introduced in the operation of the circuit. The counter 85 counts the signal fs1 and produces a signal b shown in FIG. 6(B). This signal b is formed into a signal c shown in FIG. 6(C) in the flip-flop 86. The counter 85 and the flip-flop 86 are reset by the signal a. The signal c is frequency-divided by ½ in the frequency divider 87, and a signal d shown in FIG. 6(D) is supplied to a terminal 98 via the switch 93. The signal d is inverted into a signal e shown in FIG. 6(E) in the inverter 95. The signal d is supplied directly to a terminal 100 and is supplied to a terminal 99 via the switch 94. The signal c described before is supplied directly to a terminal 96. The signal c is inverted into a signal f shown in FIG. 6(F) in the inverter 88 and is supplied to a terminal 97 via the switch 89.

The signal c from the terminal 96 is supplied to the switches 47 and 55 shown in FIG. 3 as switching control pulses, and the signal f from the terminal 97 is supplied to the switch 54 as a switching control pulse. The signal d from the terminal 98 is supplied to the switches 56 and 57 as switching control pulses, and the signal e from the terminal 99 is supplied to the switches 63 and 64 as switching control pulses. The signal e from the terminal 100 is supplied to the switches 58 and 59 as switching control pulses. The switches 54 through 59 are connected to the respective contacts R during a high level period of the corresponding switching control pulse and are connected to the respective contacts W during a low level period of the corresponding switching control pulse. The switches 63, 64 and 67 are connected to the respective contacts 63a, 64a and 67a during a high level period of the corresponding switching control pulse and are connected to the respective contacts 63b, 64b and 67b during a low level period of the corresponding switching control pulse.

Accordingly, the signal output timings of the switches 54 through 59, 63, 64 and 67 become as shown in FIGS. 6(G) through 6(O), respectively. In FIGS. 6(G) through 6(O), fs1 and fs½ respectively indicate that the signals fs1 and fs½ are outputted, CCD45 through CCD48 respectively indicate that the outputs of the CCDs 45 through 48 are outputted, and SW63 and SW64 respectively indicate that the outputs of the switches 63 and 64 are outputted.

Therefore, the color difference signals (R−Y) and (B−Y) are written into the CCDs responsive to a write-in clock pulse having the frequency of fs½ and are read out from the CCDs responsive to a read-out clock pulse having the frequency of fs1. As a result, the time-compressed color difference signals (R−Y)c and (B−Y)c having the time base thereof compressed by ½ are obtained from the output terminals 39 and 40. In addition, since there is a difference of H/2 between the read-out timings of the color difference signals (R−Y) and (B−Y), the switch 67 alternately passes the time-compressed color difference signals (R−Y)c and (B−Y)c in time sequence so as to produce the time-compressed line-sequential color difference signal. The time-compressed line-sequential color difference signal is supplied to the frequency modulator 18 shown in FIG. 1 via the output terminal 68.

Next, description will be given with respect to the operation of the circuit part 38 during the reproducing mode. In the reproducing mode, the switches 14, 50 through 53 and 60 are connected to the respective contacts PB as described before. The reproduced luminance signal shown schematically in units of 1 H in FIG. 7(A) which is obtained from the frequency demodulator 32 shown in FIG. 1 is applied to an input terminal 43 and is delayed by 1.25 H in the (1+¼)H delay circuit 34 as shown schematically in FIG. 7(B). On the other hand, the reproduced time-compressed line-sequential color difference signal shown schematically in units of 0.5 H in FIG. 7(C) which is obtained from the frequency demodulator 31 shown in FIG. 1 is applied to an input terminal 44 and is delayed by 0.5 H (H/2) in the H/2 delay circuit 33 as shown schematically in FIG. 7(D). In FIGS. 7(C) and 7(D) and FIGS. 7(I) and 7(J) which will be described later, the color difference signals (R−Y) and (B−Y) are respectively denoted by A and B, and a subscript "c" indicates that the signal is a time-compressed signal having the time base thereof compressed by ½.

For example, the H/2 delay circuit 33 is constituted by a CCD having N stages. The delayed reproduced time-compressed line-sequential color difference signal shown in FIG. 7(D) from the H/2 delay circuit 33 is supplied to the CCDs 45 and 47 via the respective switches 50 and 52. In addition, the reproduced time-compressed line-sequential color difference signal from the input terminal 44 which is not passed through the H/2 delay circuit 33 is supplied to the CCDs 46 and 48 via the respective switches 51 and 53. The reproduced time-compressed line-sequential color difference signal from the input terminal 44 is also supplied to the separating circuit 15 via the switch 14. The synchronizing signal having the period of 1 H is separated in the separating circuit 15 and is supplied to the PLL circuit 16. Hence, the PLL circuit 16 generates a first clock pulse fs1 which has the frequency of $2Nf_H$ and is in phase synchronism with the synchronizing signal from the separating circuit 15. The first clock pulse fs1 is supplied to the contacts W of the switches 54 and 55.

The first clock pulse fs1 outputted from the switch 54 is supplied to the contacts W of the switches 56 and 58, and the first clock pulse fs1 outputted from the switch 55 is supplied to the contacts W of the switches 57 and 59. On the other hand, the PLL circuit 37 generates a second clock pulse fs2 which has the frequency of $Nf_H$ and is in phase synchronism with the horizontal synchronizing signal which is separated from the reproduced luminance signal in the separating circuit 36. The second clock pulse fs2 is supplied to the contacts R of the switches 56 through 59 via the switch 60. The switching of the switches 54 through 59 is controlled by control pulses generated from the control pulse generator 17 shown in FIG. 5.

Figure 8:
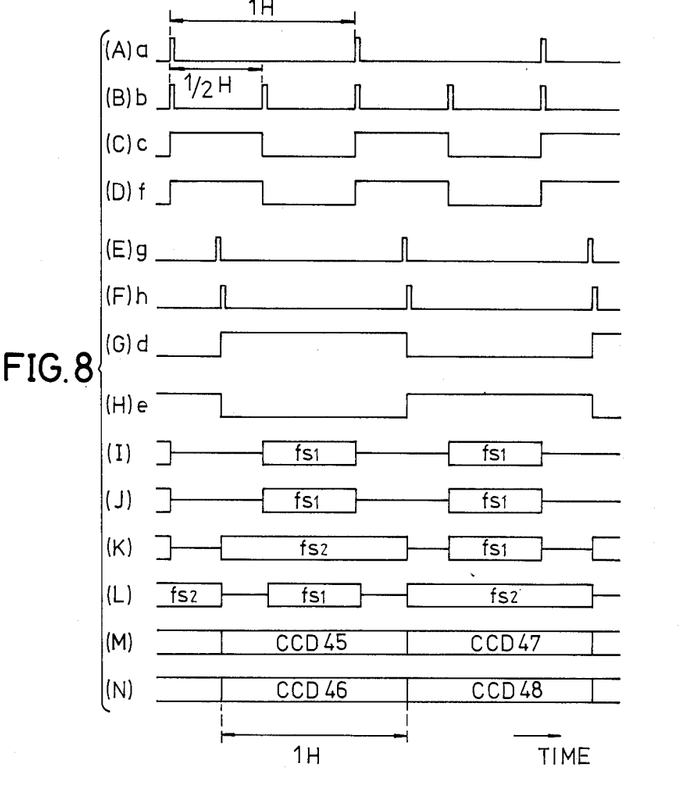
FIGS. 8(A) through 8(N) are timing charts for explaining the operation of the circuits shown in FIGS. 3 and 5 during the reproducing mode.

In FIG. 5, a signal a shown in FIG. 8(A) is supplied to the terminal 82 from the frequency divider 74 within the PLL circuit 16. The output signal b of the counter 85 becomes as shown in FIG. 8(B) and the output signal c of the flip-flop 86 becomes as shown in FIG. 8(C). Hence, the signal c is outputted via the terminal 96, and a signal f shown in FIG. 8(D) which is identical to the signal c is obtained via the switch 89 and is outputted via the terminal 97. On the other hand, the output signal of the PLL circuit 37 is supplied to the terminal 83 and is supplied to a clock terminal CK of the flip-flop 90. In addition, a signal g shown in FIG. 8(E) which is obtained from a frequency divider within the PLL circuit 37 corresponding to the frequency divider 74 of the PLL circuit 16 shown in FIG. 4 is applied to the terminal 84. This signal g is supplied to the monostable multivibrator 92. By supplying the signal g to the terminal 84 and not the horizontal synchronizing signal itself, it is possible to prevent a large error from being introduced in the operation of the circuit even when there is a dropout in the horizontal synchronizing signal, for example. The monostable multivibrator 92 supplies to a data terminal D of the flip-flop 91 a signal h shown in FIG. 8(F). The monostable multivibrator 92 is provided for the purpose of compensating beforehand for the time difference which is introduced between the luminance signal and the color difference signals when the outputs of the compressing/expanding circuit 13 are processed. The flip-flop 90 is provided to synchronize the output signal h of the monostable multivibrator 92 to the second clock pulse fs2. An output signal of the flip-flop 90 is supplied to the contact PB of the switch 93 via the flip-flop 91. Accordingly, a signal d shown in FIG. 8(G) is obtained from the terminal 98, and this signal d is also supplied to the terminal 99 via the switch 94. The signal d is inverted into a signal e shown in FIG. 8(H) in the inverter 95 and is supplied to the terminal 100. Thus, the signal output timings of the switches 54 and 55 become as shown in FIGS. 8(I) and 8(J), respectively. The signal output timings of the switches 56 and 57 are the same and are shown in FIG. 8(K). The signal output timings of the switches 58 and 59 are the same and are shown in FIG. 8(L). FIGS. 8(M) and 8(N) respectively show the signal output timings of the switches 63 and 64. In FIGS. 8(I) through 8(N), the same reference characters are used as in FIGS. 6(G) through 6(O) described before.

Figure 7:
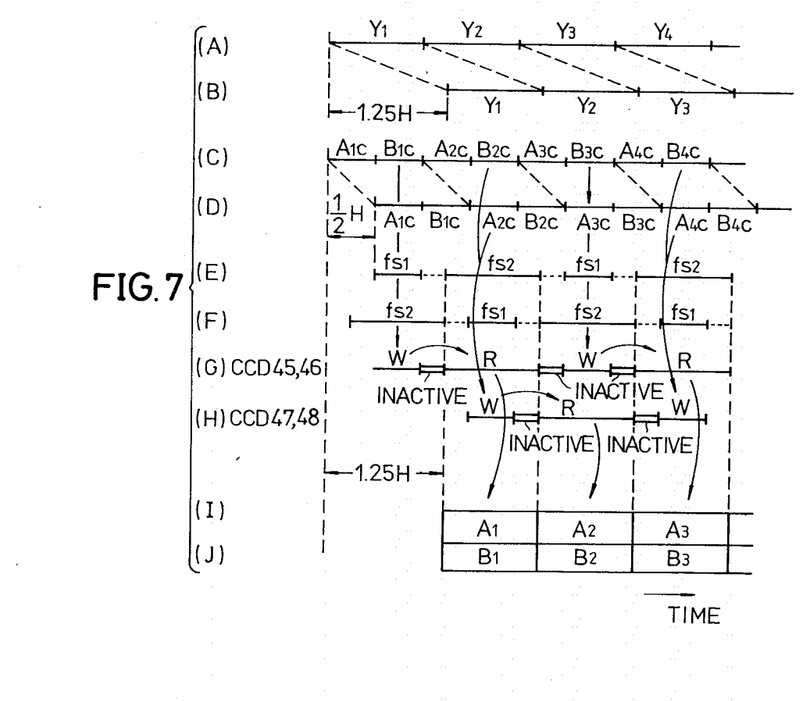

During a time period amounting to H/2 in which the H/2 delay circuit 33 supplies the time-compressed first color difference signal A1c shown in FIG. 7(D) to the CCDs 45 and 47 via the respective switches 50 and 52, the switches 54 through 57 are connected to the respective contacts W and the switches 58 and 59 are connected to the respective contacts R. For this reason, the CCD 45 writes the time-compressed first color difference signal A1c for all of the stages thereof responsive to the first clock pulse fs1 from the PLL circuit 16, as indicated by W in FIG. 7(G). In addition, the CCD 46 writes the time-compressed second color difference signal B1c shown in FIG. 7(C) from the input terminal 44 for all of the stages thereof responsive to the first clock pulse fs1, as indicated by W in FIG. 7(G). On the other hand, the second clock pulse fs2 is supplied to the CCDs 47 and 48 via the switch 60 during this time period amounting to H/2.

After the above time period amounting to H/2, the switches 54 and 55 are connected to the respective contacts R for a time period amounting to 0.5 H (=H/2), and the switches 56 and 57 are also connected to the respective contacts R after a time period amounting to 0.25 H. Hence, neither the first clock pulse fs1 nor the second clock pulse fs2 is supplied to the CCDs 45 and 46 for a time period of 0.25 H, and the CCDs 45 and 46 are both in an inactive state during this time period amounting to 0.25 H. During the next time period amounting to 1 H, the switches 54 and 55 which were connected to the respective contacts R are switched over and connected to the respective contacts W after a time period of 0.25 H, and after being connected to the contacts W for a time period of 0.5 H, the switches 54 and 55 are switched over and connected to the respective contacts R. In addition, during this next time period amounting to 1 H, the switches 56 and 57 are connected to the respective contacts R and the switches 63 and 64 are connected to the respective contacts 63a and 64a responsive to the control pulses from the control pulse generator 17. Hence, the second clock pulse fs2 from the PLL circuit 37 is supplied to the CCDs 45 and 46 as shown schematically in FIG. 7(E) via the respective switches 56 and 57. Consequently, the time-compressed first and second color difference signals A1c and B1c which are stored for all of the stages of the respective CCDs 45 and 46 are read out responsive to the second clock pulse fs2 with the time base thereof expanded by two. The read out first color difference signal A1 from the CCD 45 is supplied to the output terminal 39 via the switch 63, and the read out second color difference signal B1 from the CCD 46 is supplied to the output terminal 40 via the switch 64. In other words, during this time period amounting to 1 H, the CCDs 45 and 46 carry out the read-out operation as indicated by R in FIG. 7(G). As a result, the reproduced first color difference signal (R−Y) (or A1) which is returned to the original time base is outputted via the output terminal 39 as shown in FIG. 7(I), and the reproduced second color difference signal (B−Y) (or B1) is outputted via the output terminal 40 as shown in FIG. 7(J). Furthermore, the reproduced luminance signal Y1 is outputted via the output terminal 35 as shown in FIG. 7(B). The time base of the reproduced color difference signals (R−Y) and (B−Y) outputted via the respective output terminals 39 and 40 is matched with the time base of the reproduced luminance signal Y1 outputted via the output terminal 35.

Next, the switches 54 and 55 are connected to the respective contacts R for a time period amounting to 0.25 H, and the switches 54 through 57 are thereafter connected to the respective contacts W for a time period amounting to 0.5 H. Accordingly, the CCDs 45 and 46 respectively write the time-compressed color difference signals A3c and B3c responsive to the first clock pulse fs1. Similar operations of the CCDs 45 and 46 are repeated thereafter, and the two kinds of time-compressed color difference signals (R−Y)c and (B−Y)c in the odd numbered horizontal scanning periods of the time-compressed line-sequential color difference signal are read out from the CCDs 45 and 46 with the time base thereof expanded by two and returned to the original time base.

On the other hand, by the switching of the switches 54, 55, 58 and 59, as shown schematically in FIG. 7(F), the first and second clock pulses fs1 and fs2 are supplied to the CCDs 47 and 48 with a timing which is delayed by 1 H compared to the timing with which the first and second clock pulses fs1 and fs2 are supplied to the CCDs 45 and 46 as shown in FIG. 7(E), where both the two timings have a period of 2H. In other words, during the time period amounting to 1 H in which the second clock pulse fs2 is supplied to the CCDs 45 and 46, no clock pulse is supplied to the CCDs 47 and 48 for a first time period amounting to 0.25 H, the first clock pulse fs1 is supplied to the CCDs 47 and 48 for a second time period amounting to 0.5 H and no clock pulse is supplied to the CCDs 47 and 48 for a third time period amounting to 0.25 H. During the next time period amounting to 1 H in which the second clock pulse fs2 is supplied to the CCDs 47 and 48, no clock pulse is supplied to the CCDs 45 and 46 for a first time period amounting to 0.25 H, the first clock pulse fs1 is supplied to the CCDs 45 and 46 for a second time period amounting to 0.5 H and no clock pulse is supplied to the CCDs 45 and 46 for a third time period amounting to 0.25 H. In addition, the switches 63 and 64 are linked and are switched for every time period of 1 H so as to selectively pass the output signals of the CCDs which are supplied with the second clock pulse fs2. For this reason, as shown schematically in FIG. 7(H), the CCDs 47 and 48 are in the inactive state for a time period amounting to 0.25 H after carrying out the write operation for a time period amounting to 0.5 H as indicated by W. Then, the CCDs 47 and 48 carry out the read operation for a time period amounting to 1 H as indicated by R, and the CCDs 47 and 48 are in the inactive state thereafter for a time period amounting to 0.25 H. Similar operations of the CCDs 47 and 48 are repeated thereafter, and the two kinds of time-compressed color difference signals (R−Y)c and (B−Y)c in the even numbered horizontal scanning periods of the time-compressed line-sequential color difference signal are read out from the CCDs 47 and 48 with the time base thereof expanded by two and returned to the original time base.

The read-out operations of the CCDs 45 and 46 and the read-out operations of the CCDs 47 and 48 are alternately carried out for every time period of 1 H. In addition, the write-in operations of the CCDs are carried out thereafter for the time period of 0.5 H after the inactive interval amounting to 0.25 H, and the inactive interval amounting to 0.25 H is also provided after each write-in operation. Further, since the write-in operation is carried out responsive to the first clock pulse fs1 which is produced based on the synchronizing signal within the reproduced time-compressed line-sequential color difference signal and the read-out operation is carried out responsive to the second clock pulse fs2 which is produced based on the synchronizing signal within the reproduced luminance signal, the time base of the reproduced luminance signal shown in FIG. 7(B) obtained from the output terminal 35 is matched with the time base of the reproduced color difference signals (R−Y) and (B−Y) shown in FIGS. 7(I) and 7(J) obtained from the output terminals 39 and 40.

When it is assumed that the time-compressed color difference signals (R−Y)c and (B−Y)c are alternately transmitted in time sequence for every time period T in the reproduced time-compressed line-sequential color difference signal, the reproduced luminance signal is delayed by a time period $(2nT+\alpha)$, where n=1 or 2. In the present embodiment, n=1 and T=0.5 H, and because the delay time of the $(1+\frac{1}{4})$H delay circuit 34 is 1.25 H, $\alpha=0.25$ H $(=H/4)$. According to the present embodiment in which $\alpha=0.25$ H, the inactive intervals before and after each write-in operation of the CCDs 45 through 48 each amount to 0.25 H, and the time base compensation range becomes +0.25 H to −0.25 H which is approximately 31 μsec in total. Hence, this time base compensation range of approximately 31 μsec is considerably wider that the conventional time base compensation range of 2.5 μsec.

The time base compensation range can be made the widest when $\alpha=0.25$ H for the jitters in both directions on the time base. But when the jitter is only in one direction, the value of $\alpha$ may be set to zero or T. In other words, the value of $\alpha$ is set within a range of $0\leq\alpha\leq T$.

In the described embodiment, the luminance signal is delayed in total by $(2+\frac{1}{2})$H in the recording system and the reproducing system of the recording and reproducing apparatus. For this reason, when the apparatus is designed to delay the luminance signal by $(1+\frac{1}{4})$H in each of the recording and reproducing systems, the same delay circuit may be used in common for the recording and reproducing systems. It is evident that the two kinds of color difference signals is not limited to the color difference signals (R−Y) and (B−Y) described heretofore, and I and Q signals, narrow frequency band color signal $C_N$ and wide frequency band color signal $C_W$ and the like may be used as the two kinds of color difference signals. Moreover, the time base compression ratio is not limited to that of the embodiment described heretofore. It is also possible to use as the analog memories charge transfer elements other than the CCDs.

Further, the present invention is not limited to these embodiments, and various variations and modifications may be made without departing from the scope of the present invention.

What is claimed is:

1. A color video signal recording and reproducing apparatus comprising:
   first recording and reproducing means for recording and reproducing on and from a first track of a recording medium a time-compressed line-sequential color difference signal in which time-compressed first and second color difference signals having the time base thereof compressed and added with a synchronizing signal are alternately transmitted in time sequence for every time period T;
   second recording and reproducing means for recording and reproducing a luminance signal on and from a second track of the recording medium, said second track being independent of said first track, said first and second recording and reproducing means carrying out recording operations simultaneously and carrying out reproducing operations simultaneously;
   first delay means for delaying a reproduced time-compressed line-sequential color difference signal from said first recording and reproducing means by a time period T;
   second delay means for delaying a reproduced luminance signal from said second recording and reproducing means by a time period $2nT+\alpha$, where n=0 or 1 and $0\leq\alpha\leq T$;
   first clock pulse producing means for producing a first clock pulse based on the synchronizing signal within the reproduced time-compressed line-sequential color difference signal from said first recording and reproducing means;
   second clock pulse producing means for producing a second clock pulse based on a synchronizing signal within a delayed reproduced luminance signal from said second delay means; and
   time base expanding means including memory means for writing the reproduced time-compressed line-sequential color difference signal from said first recording and reproducing means and a delayed reproduced time-compressed line-sequential color difference signal from said first delay means into said memory means responsive to said first clock pulse and for reading out stored signals from said memory means responsive to said second clock pulse, so as to produce simultaneously in parallel first and second color difference signals having the time base which is matched with the time base of the delayed reproduced luminance signal from said second delay means and is expanded and returned to the original time base.

2. A color video signal recording and reproducing apparatus as claimed in claim 1 in which said time-compressed line-sequential color difference signal comprises time-compressed first and second color difference signals having the time base thereof compressed so that information amounting to one horizontal scanning period is transmitted within $\frac{1}{2}$ the horizontal scanning period, said time period T being selected to $\frac{1}{2}$ the horizontal scanning period.

3. A color video signal recording and reproducing apparatus as claimed in claim 2 in which said first clock pulse producing means comprises a first separating circuit for separating the synchronizing signal within the reproduced time-compressed line-sequential color difference signal from said first recording and reproducing means and a first phase locked loop circuit for producing from the synchronizing signal separated in said first separating means the first clock pulse having a frequency of $2Nf_H$, where N is a natural number and $f_H$ denotes the horizontal scanning frequency, and said second clock pulse producing means comprises a second separating circuit for separating the synchronizing signal within the delayed reproduced luminance signal from said second delay means and a second phase locked loop circuit for producing from the synchronizing signal separated in said second separating means the second clock pulse having a frequency of $Nf_H$.

4. A color video signal recording and reproducing apparatus as claimed in claim 3 in which said first phase locked loop circuit comprises a first phase comparator supplied with the synchronizing signal from said first separating circuit, a first filter supplied with an output signal of said first phase comparator, a first voltage controlled oscillator controlled of an oscillation frequency thereof by an output signal of said first filter and a first frequency divider for frequency-dividing an output signal of said first voltage controlled oscillator by ½N and for supplying an output signal thereof to said first phase comparator, said first phase comparator comparing the phase of the synchronizing signal from said first separating circuit and the phase of the output signal of said first frequency divider and supplying a phase error signal to said first filter, said first voltage controlled oscillator producing the output signal thereof as the output signal of said first phase locked loop circuit.

5. A color video signal recording and reproducing apparatus as claimed in claim 4 in which said second phase locked loop circuit comprises a second phase comparator supplied with the synchronizing signal from said second separating circuit, a second filter supplied with an output signal of said second phase comparator, a second voltage controlled oscillator controlled of an oscillation frequency thereof by an output signal of said second filter and a second frequency divider for frequency-dividing an output signal of said second voltage controlled oscillator by 1/N and for supplying an output signal thereof to said second phase comparator, said second phase comparator comparing the phase of the synchronizing signal from said second separating circuit and the phase of the output signal of said second frequency divider and supplying a phase error signal to said second filter, said second voltage controlled oscillator producing the output signal thereof as the output signal of said second phase locked loop circuit.

6. A color video signal recording and reproducing apparatus as claimed in claim 1 in which said memory means comprises first and second memories supplied with the reproduced time-compressed line-sequential color difference signal from said first recording and reproducing means and third and fourth memories supplied with the delayed reproduced time-compressed line-sequential color difference signal from said first delay means, said second and fourth memories during a first time period amounting to 2nT carrying out a write-in operation for a write-in time period amounting to nT and being inactive for a time period $\alpha$ before and after the write-in time period and during a second time period amounting to 2nT immediately after said first time period carrying out a read-out operation, said first and third memories during said first time period carrying out a read-out operation and during said second time period carrying out a write-in operation for a write-in time period amounting to nT and being inactive for a time period $\alpha$ before and after the write-in time period.

7. A color video signal recording and reproducing apparatus as claimed in claim 6 in which said time base expanding means further comprises switching means for alternately passing signals read out from said first and second memories for every time period of 2nT so as to produce the first color difference signal having the time base thereof expanded and returned to the original time base and for alternately passing signals read out from said third and fourth memories for every time period of 2nT so as to produce the second color difference signal having the time base thereof expanded and returned to the original time base, said switching means simultaneously outputting in parallel the first and second color difference signals in the original time base.

8. A color video signal recording and reproducing apparatus as claimed in claim 7 in which said time period T is selected to ½ the horizontal scanning period, n is equal to one and $\alpha$ is selected to ¼ the horizontal scanning period.

9. A color video signal recording and reproducing apparatus as claimed in claim 6 in which said first through fourth memories each comprise a charge coupled device.

* * * * *